United States Patent Office 3,286,158
Patented Nov. 15, 1966

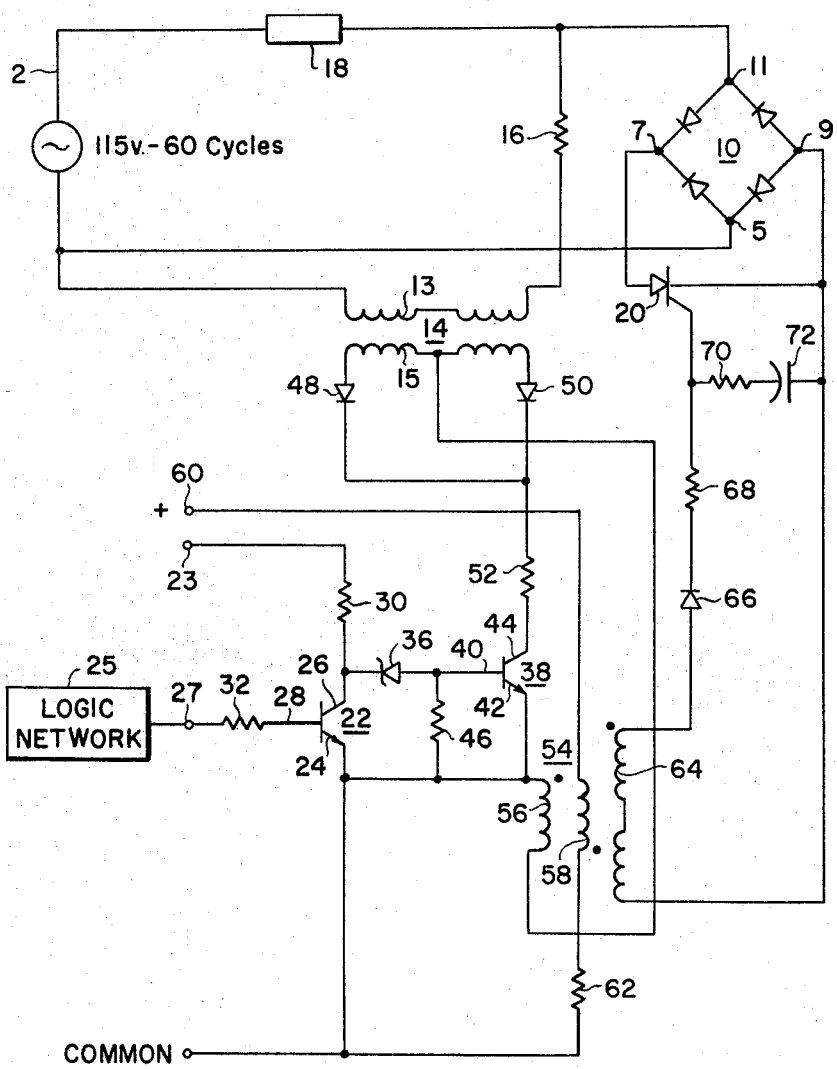

3,286,158
A.C. SWITCH
Robert R. Thatcher, Roanoke, Va., assignor to General
Electric Company, a corporation of New York
Filed June 22, 1962, Ser. No. 204,397
9 Claims. (Cl. 323—22)

This invention relates to static switches. More particularly, it relates to a full-wave phase controlled A.C. switch.

In many circuit situations, it is necessary to energize a load which requires a high inrush current, a typical example of such a load being a solenoid. Magnetic amplifiers utilized for such purpose present the disadvantage of limited current capacity whereby it is necessary to use large sized magnetic amplifiers to provide the inrush current for the load. Silicon controlled rectifiers, being extremely low impedance devices, readily provide such inrush capability.

It is often also desired to operate loads in response to signals produced from logic circuits. For example, small single phase A.C. motors might be operated in this manner. Such arrangement would permit an A.C. motor to be operated ON and OFF directly or the motor could be used in series arrangement with a manually operated switch as a permissive circuit to override the manual control and halt the motor in response to signals from the logic circuitry. The logic signal could be of a protective or limit type.

Accordingly, it is an object of this invention to provide a static A.C. switch utilizing a gate controlled rectifier as the switch controlling element.

It is a further object to provide an A.C. switch in accordance with the preceding object wherein said gate controlled rectifier is controlled by D.C. logic signals.

It is another object to provide an A.C. switch in accordance with the preceding objects wherein isolation is effected between A.C. power circuits and D.C. control circuits.

It is still another object to provide an A.C. switch in accordance with the preceding objects wherein the controlling of the gate controlled rectifier is synchronized with the frequency of the A.C. power supply.

Generally speaking and in accordance with the invention, there are provided in combination with an A.C. power supply, a load and a signal source which produces a first signal in response to a first given condition and a second signal in response to a second given condition, a bridge rectifier having a pair of A.C. input terminals in series arrangement with the power supply and the load and positive and negative output terminals. There are further provided means in circuit with the A.C. supply, the load and the rectifier for deriving a positive pulse train in synchronism with the successive half cycles of output from the power supply. A gate controlled rectifier having a gate electrode, an anode connected to the positive terminal and a cathode connected to the negative terminal is included and means are provided for selectively applying the pulses to the gate electrode only in response to the occurrence of one of the signals.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawing which is a schematic representation of an illustrative embodiment of the invention.

In the drawing, a source of line A.C. voltage which may suitably be 115 volts, 60 cycles is applied to a full-wave rectifier bridge 10 and is also applied to the primary winding 13 of a transformer 14 which is suitably of the saturable type through a current limiting resistor 16. The load 18 is connected between terminal 2 of the A.C. source and A.C. terminal 11 of bridge rectifier 10. The D.C. positive and negative terminals 7 and 9 respectively of rectifier 10 are connected to the anode and cathode respectively of a silicon controlled rectifier 20.

A first transistor 22 comprises an emitter 24 connected to common, a collector 26 connected to terminal 23 through a resistor 30 and a base 28 connected to a terminal 27 through a resistor 32 which may be connected to a logic network 25 as is further explained hereinbelow. Collector 26 is also connected to the base 40 of a second transistor 38 through the cathode to anode path of a Zener diode 36.

In transistor 38, base 40 is connected to common through a resistor 46 and the emitter 42 is directly connected to common. The terminals of secondary winding 15 of transformer 14 are connected to collector 44 of transistor 38 through the anode to cathode paths of diodes 48 and 50 respectively and common resistor 52.

The output of transistor 38 is developed in a transformer 54 which may be of the saturable type. Transformer 54 comprises a primary winding 56 connected between emitter 42 and the midpoint of secondary winding 15; a reset winding 58 connected at one terminal thereof to a source of positive potential 60 and at its other terminal to common through a resistor 62; and a secondary winding 64 having one terminal thereof connected to the gate electrode of silicon controlled rectifier 20 through the anode to cathode path of a diode 66 and a resistor 68 and its other terminal connected to the cathode of silicon controlled rectifier 20. A series arrangement of a resistor 70 and a capacitor 72 is connected between the gate electrode and cathode of silicon controlled rectifier 20.

Considering the operation of the circuit of the figure, with the application of A.C. line voltage thereto and silicon controlled rectifier 20 in the blocking state, little power is applied to load 18. The A.C. voltage taken from the A.C. terminals 5 and 11 of full-wave rectifier 10 appears in transformer 14. Since transformer 14 is chosen to be of the saturable type, it saturates in opposite directions at some point during each half cycle of output from the A.C. source, the period to effect such saturation being dependent upon the volt-second characteristic of the core material of transformer 14. Consequently, positive pulses appear through diodes 48 and 50 during those portions of alternating current voltage half cycles in which the transformer is not saturated and are applied to collector 44 of transistor 38.

In this connection, it is to be noted that the reversal of A.C. voltage across rectifier bridge 10 causes transformer 14 to unsaturate, thus delivering the pulse of collector voltage to transistor 38 at the beginning of the A.C. half cycle.

Transistor 38 is rendered conductive when a positive signal is applied at terminal 23 concurrently with the appearance of a positive pulse at collector 44 provided that there is no positive signal applied at the same time to base 28 of transistor 22. In such situation, current flows from terminal 23 through resistor 30 and Zener diode 36 into base 40 of transistor 38. The current flows in base 40 causing a substantially larger current to flow in the collector circuit which includes primary winding 56 due to the current gain of transistor 38. As far as this collector circuit is concerned, it will appear as if transistor 38 is a short circuit, and the current flowing through transformer 14 energizes transformer 54 to deliver a current pulse to the gate electrode of silicon controlled rectifier 20.

The consequent positive output appearing at emitter 42 appears in saturable transformer 54 and is applied therefrom to the gate electrode of silicon controlled rectifier 20 through the anode to cathode path of diode 66 and resistor 68. Silicon controlled rectifier 20 is consequently rendered conductive substantially shorting full-wave rectifier 10 and the voltage from the A.C. source is substantially fully applied to load 18, the latter voltage being slightly diminished by the voltage drops in full-wave rectifier 10 and silicon controlled rectifier 20 when it conducts. Due to the voltage drop in rectifier 10, current at the end of a half cycle essentially reaches zero and silicon controlled rectifier 20 at that time is commutated into nonconductivity. When silicon controlled rectifier 20 goes out of conduction, the rise in voltage on rectifier 10 causes the gating pulse to be delivered immediately after the current attains the zero state to refire silicon controlled rectifier 20 for the next half cycle (control signals from logic network 25 so permitting). This is important, for example, where load 18 is inductive such as a solenoid where the current zero lags the line voltage zero. Load 18 is suitably of the type which is not energized by the quantity of A.C. voltage applied thereto when silicon controlled rectifier 20 is nonconductive.

In the situation where a positive inhibit signal appears at base 28, for example, from a logic network such as 25 to render transistor 22 conductive, the consequent negative voltage excursion at collector 26 lowers the voltage thereat to a point sufficiently low whereby Zener diode functions in its blocking state and transistor 38 is not rendered conductive despite the concurrent appearance of a pulse at collector 44 and a signal at base 40. Zener diode 36 prevents the appearance of a signal current into base 40 in this situation. Thus, transistor 38 passes no collector current. Consequently, no voltage pulse is applied to the gate electrode of silicon controlled recitifier 20 to render it conductive. The situation here is to prevent silicon controlled rectifier conduction by applying the signal appearing at terminal 27 to inhibit the signal appearing at terminal 23 from reaching base 40. Of course, the values of the voltages applied to transistors 22 and 38 respectively, the values of resistor 30 and the breakdown voltage of Zener diode 36 have to be chosen such that transistor 38 is rendered conductive at the coincidence of only the pulse from transformer 14 and the signal from terminal 23 but is nonconductive at the coincidence of these signals and the appearance of a signal at base 28. Generally, a steady state D.C. voltage can be applied from terminal 23 and the input to base 28 can be a logic signal. With such arrangement, the signal from terminal 23 can also serve as the positive voltage supply for collector 26.

Resistors 68 and 70 and capacitor 72 provide an RC filter for the output of transformer 54 to insure that silicon controlled rectifier 20 is not gated into conductivity by noise pulses. Diode 66 insures that no negative pulses are applied to the gate electrode of silicon controlled rectifier 20. The series arrangement of winding 58 and resistor 62 is utilized to reset transformer 54 to the unsaturated state to insure transformer action by transformer 54 whenever there is an output from transistor 38. Transformer 54 functions to provide isolation between the D.C. voltage required to gate silicon controlled rectifier 20 into conductivity and the A.C. source voltage. The arrangement wherein the voltage source for positive pulses for transistor 38 are the A.C. terminals of full-wave rectifier 10 in association with transformer 14 provides synchronization between the rendering conductive of transistor 38 with the consequent rendering conductive of silicon controlled rectifier 20 and the A.C. source voltage.

While a particular embodiment of the invention has been shown, it will, of course, be understood that the invention is not to be limited thereto since many modifications both in the circuit arrangement and in the instrumentalities employed, may be made, and it is, therefore, contemplated by the appended claims to cover any such modifications as fall within the true spirit and scope of the invention.

What is claimed as new and desired to be secured by Letters Patent of the United States is:

1. In combination with an A.C. power supply, a load and a unidirectional potential source which produces a first signal in response to a first given condition and a second signal in response to a second given condition, a bridge rectifier having a pair of A.C. input terminals in series arrangement with the power supply and the load and positive and negative D.C. output terminals, means in circuit with said A.C. supply, load and rectifier for deriving a positive pulse train in synchronism with the successive half cycles of output from said power supply, a gate controlled rectifier having an anode connected to said positive terminal, a cathode connected to said negative terminal, and a gate electrode and means in circuit with said unidiretcional potential source for selectively applying said pulses to said gate electrode only in response to the occurrence of one of said signals.

2. In combination with an A.C. power supply, a load and a unidirectional potential source which produces a first signal in response to a first given condition and a second signal in response to a second given condition, a bridge rectifier having a pair of A.C. input terminals in series arrangement with the power supply and the load and positive and negative D.C. output terminals, the combination of a transformer in circuit with said power supply, said rectifier and said load, and rectifying means in circuit with the output of said transformer for deriving a pulse train comprising pulses in synchronism with the half cycles of output from said power supply, a gate controlled rectifier having an anode connected to said positive terminal, a cathode connected to said negative terminal and a gate electrode and means in circuit with said unidirectional potential source for selectively applying said pulses to said gate electrode only in response to the occurrence of one of said signals.

3. In the combination defined in claim 2 wherein said transformer is of the saturable type.

4. In combination with an A.C. power supply, a load and a unidirectional potential source which produces a first signal in response to a first given condition and a second signal in response to a second given condition, a bridge rectifier having a pair of A.C. input terminals in series arrangement with the power supply and the load and positive and negative D.C. output terminals, the combination of a transformer in circuit with said power supply, said rectifier and said load and rectifying means in circuit with the output of said transformer for deriving a pulse train comprising pulses in synchronism with the half cycles of output from said power supply, a gate controlled rectifier having an anode connected to said positive terminal, a cathode connected to said negative terminal and a gate electrode, active means which is only rendered conductive upon the application thereto of a pulse coincident with the occurrence of one of said signals, and means in circuit with said unidirectional potential source for applying the output of said active means to said gate electrode.

5. In the combination defined in claim 4 wherein said applying means includes a transformer.

6. In the combination defined in claim 5 wherein said transformers are of the saturable type.

7. In the combination defined in claim 5 wherein said active means comprises a transistor which is rendered conductive only upon the coincident application thereto of a pulse and one of said signals and is maintained nonconductive upon the coincident application thereto of a pulse and the other of said signals.

8. In the combination defined in claim 5 wherein said active means comprises a series arrangement of first and second transistors, said second transistor being rendered conductive upon the coincident application thereto of a pulse and the application of said first signal to said first transistor and is maintained nonconductive upon the coincident application thereto of a pulse and the application of the second signal to the first transistor, the output of said second transistor being applied to said gate electrode.

9. In the combination defined in claim 8 wherein said applying means includes a transformer of the saturable type and means for resetting said transformer from the saturated to the non-saturated state.

References Cited by the Examiner
UNITED STATES PATENTS

| | | | |
|---|---|---|---|
| 2,989,686 | 6/1961 | Pinckaers | 323—56 |
| 2,998,547 | 8/1961 | Berman | 315—200 |
| 3,040,239 | 6/1962 | Walker | 323—24 |

OTHER REFERENCES

Controlled Rectifier Manual, published by Rectifier Components Department of General Electric Company, 1960, Fig. 7.10.

JOHN F. COUCH, *Primary Examiner.*

LLOYD McCOLLUM, *Examiner.*

K. HADLAND, K. D. MOORE, *Assistant Examiners.*